US009829106B2

(12) United States Patent
Thackway et al.

(10) Patent No.: US 9,829,106 B2
(45) Date of Patent: Nov. 28, 2017

(54) SEALING ARRANGEMENT FOR GAS TURBINE TRANSITION PIECES

(71) Applicant: Siemens Energy, Inc., Orlando, FL (US)

(72) Inventors: Richard L. Thackway, Oviedo, FL (US); Charalambos Polyzopoulos, Orlando, FL (US); James M. Hurney, Port Orange, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/811,864

(22) Filed: Jul. 29, 2015

(65) Prior Publication Data
US 2017/0030267 A1  Feb. 2, 2017

(51) Int. Cl.
*F16J 15/447* (2006.01)
*F16J 15/02* (2006.01)
*F01D 9/02* (2006.01)
*F16J 15/3288* (2016.01)
*F02C 7/28* (2006.01)
*F01D 11/00* (2006.01)

(52) U.S. Cl.
CPC .......... *F16J 15/022* (2013.01); *F01D 9/023* (2013.01); *F01D 11/003* (2013.01); *F02C 7/28* (2013.01); *F16J 15/3288* (2013.01); *F01D 11/005* (2013.01); *F05D 2240/56* (2013.01)

(58) Field of Classification Search
CPC ........ F01D 9/023; F01D 11/00; F01D 11/005; F05D 2240/55; F05D 2240/56; F05B 2240/57; F05B 2240/571; F16J 15/3288
See application file for complete search history.

(56) References Cited

U.S. PATENT DOCUMENTS

| 5,265,412 | A  | * | 11/1993 | Bagepalli | ............... F01D 9/023 277/355 |
| 5,400,586 | A  | * | 3/1995  | Bagepalli | ............... F01D 9/023 277/355 |
| 5,474,306 | A  | * | 12/1995 | Bagepalli | ............... F01D 9/023 277/355 |
| 8,398,090 | B2 | * | 3/2013  | McMahan   | ............... F01D 9/023 277/643 |
| 8,562,000 | B2 |   | 10/2013 | Moehrle et al. | |
| 2008/0053107 | A1 | * | 3/2008 | Weaver | ................... F01D 9/023 60/800 |

* cited by examiner

*Primary Examiner* — Gilbert Y Lee

(57) ABSTRACT

A sealing arrangement for sealing between adjacent first and second exit frames each associated with a transition piece of a turbine. The arrangement includes a transition side seal having bristles that extend from a rail wherein the rail is bendable in a plurality of directions to accommodate bowing of an associated exit frame. The first exit frame includes a rail slot for receiving the rail. The second exit frame includes a bristle slot for receiving the bristles to form a seal between the first and second exit frames, wherein the bristle slot includes a bottom section. The bristles are separated from the bottom section by a bristle gap that is sized to accommodate movement of at least one transition piece to maintain a seal between the first and second exit frames or avoid damage to the bristles.

18 Claims, 5 Drawing Sheets

SEALING ARRANGEMENT FOR GAS TURBINE TRANSITION PIECES

FIELD OF THE INVENTION

This invention relates to sealing arrangement for sealing between adjacent exit frames of a transition piece in a gas turbine, and more particularly, to a sealing arrangement that includes a transition side seal having bristles that extend from a rail wherein a first exit frame includes a rail slot for receiving the rail and a second exit frame includes a bristle slot for receiving the bristles wherein the bristle slot includes a bottom section and the bristles are separated from the bottom section by a bristle gap that is sized to accommodate movement of at least one transition piece to maintain a seal between the first and second exit frames and avoid damage to the bristles.

BACKGROUND OF THE INVENTION

In various multistage turbomachines used for energy conversion, such as gas turbines, a fluid is used to produce rotational motion. Referring to FIG. 1, an axial flow gas turbine 10 includes a multi-stage compressor section 12, a combustion section 14, a multi stage turbine section 16 and an exhaust system 18 arranged along a center axis 20. Air at atmospheric pressure is drawn into the compressor section 12 generally in the direction of the flow arrows F along the axial length of the turbine 10. The intake air is progressively compressed in the compressor section 12 by rows of rotating compressor blades, thereby increasing pressure, and directed by mating compressor vanes to the combustion section 14, where it is mixed with fuel, such as natural gas, and ignited to create a combustion gas. The combustion gas, which is under greater pressure, temperature and velocity than the original intake air, is directed to the turbine section 16. The turbine section 16 includes a plurality of airfoil shaped turbine blades 22 arranged in a plurality of rows $R_1$, $R_2$, etc. on a shaft 24 that rotates about the axis 20. The combustion gas expands through the turbine section 16 where it is directed in a combustion flow direction F across the rows of blades 22 by associated rows of stationary vanes 24. A row of blades 22 and associated row of vanes 24 form a stage. In particular, the turbine section 16 may include four stages. As the combustion gas passes through the turbine section 16, the combustion gas causes the blades 22 and thus the shaft to rotate about the axis 20, thereby extracting energy from the flow to produce mechanical work.

The combustion section 14 includes several individual combustion assemblies 26 each including a basket and nozzle and arranged in a circular array about the axis 20. A respective circular array of transition ducts, also known as transition pieces 28, connects the outflow of each combustor assembly 26 to an inlet of the turbine section 16. Each transition piece 28 may be a tubular or other appropriately shaped structure that channels the combustion gas between a combustion chamber and a first row or stage of stationary vanes of the turbine section 16.

A downstream end 30 of each transition piece 28 includes an exit frame 32 that is attached to a corresponding inlet of the turbine section 16 thus forming a circular array of adjacent exit frames about the axis 20. Radially outer and inner seals are used on each exit frame 32 to seal against respective radially outer and inner retainer elements of a turbine inlet to minimize air leakage between the transition piece 28 and the turbine inlet. Further, side seals are used between adjacent exit frames 32 to minimize air leakage between the exit frames 32. It is desirable to enhance the longevity and reliability of the sealing arrangement between the exit frames 32 and the side seals in order to maintain engine efficiency and performance while also reducing repair costs.

SUMMARY OF INVENTION

A sealing arrangement for sealing between adjacent first and second exit frames each associated with a transition piece of a turbine is disclosed. The arrangement includes a transition side seal having bristles that extend from a rail wherein the rail is bendable in a plurality of directions, such as transverse and normal to the bristles, to accommodate bowing of an associated exit frame. In an embodiment, the rail 42 is relatively thin and fabricated from a flexible material to provide sufficient bending. The first exit frame includes a rail slot for receiving the rail. The second exit frame includes a bristle slot for receiving the bristles to form a seal between the first and second exit frames, wherein the bristle slot includes a bottom section. The bristles are separated from the bottom section by a bristle gap that is sized to accommodate movement of at least one transition piece exit frame to maintain a seal between the first and second exit frames or avoid damage to the bristles. The bristles are also sized to avoid disengagement of the bristles from the bristle slot Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
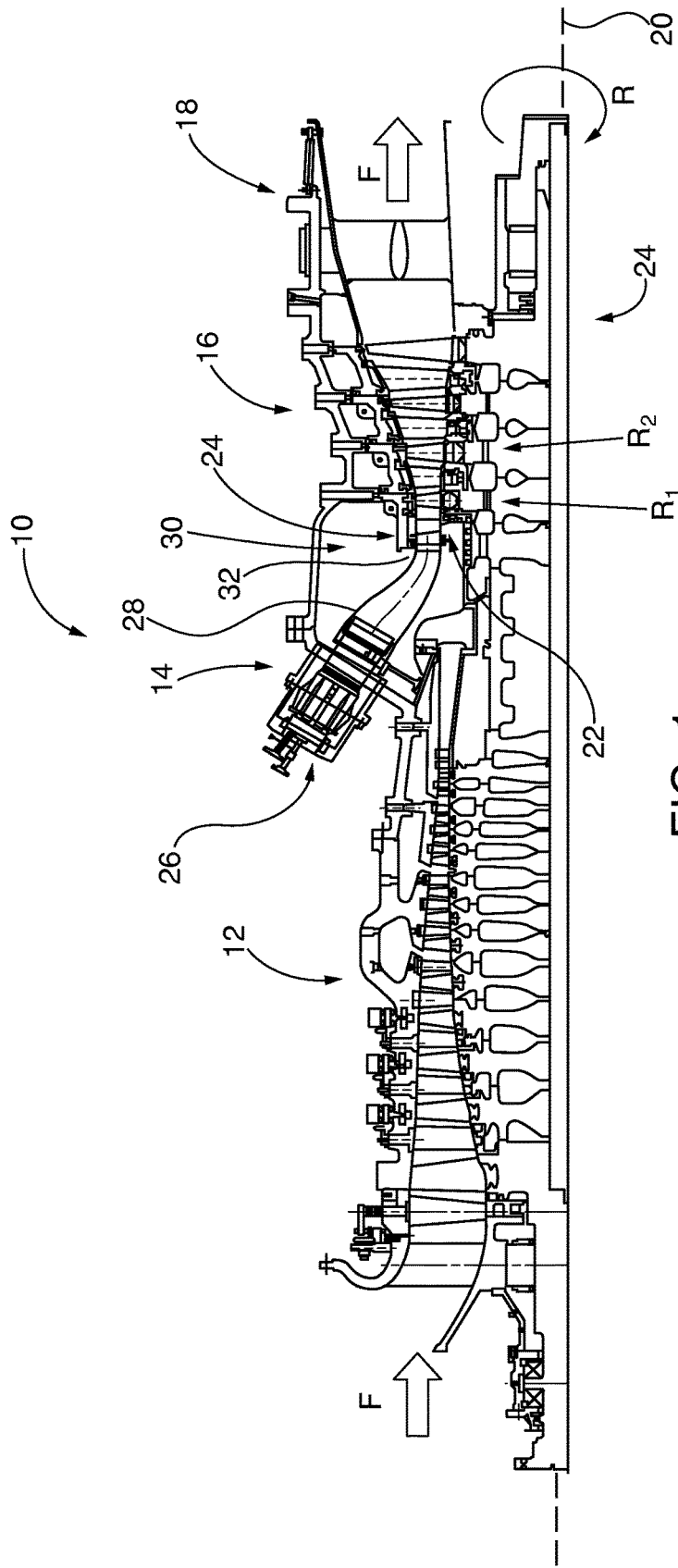
FIG. 1 is a partial cross sectional view of an axial flow gas turbine.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
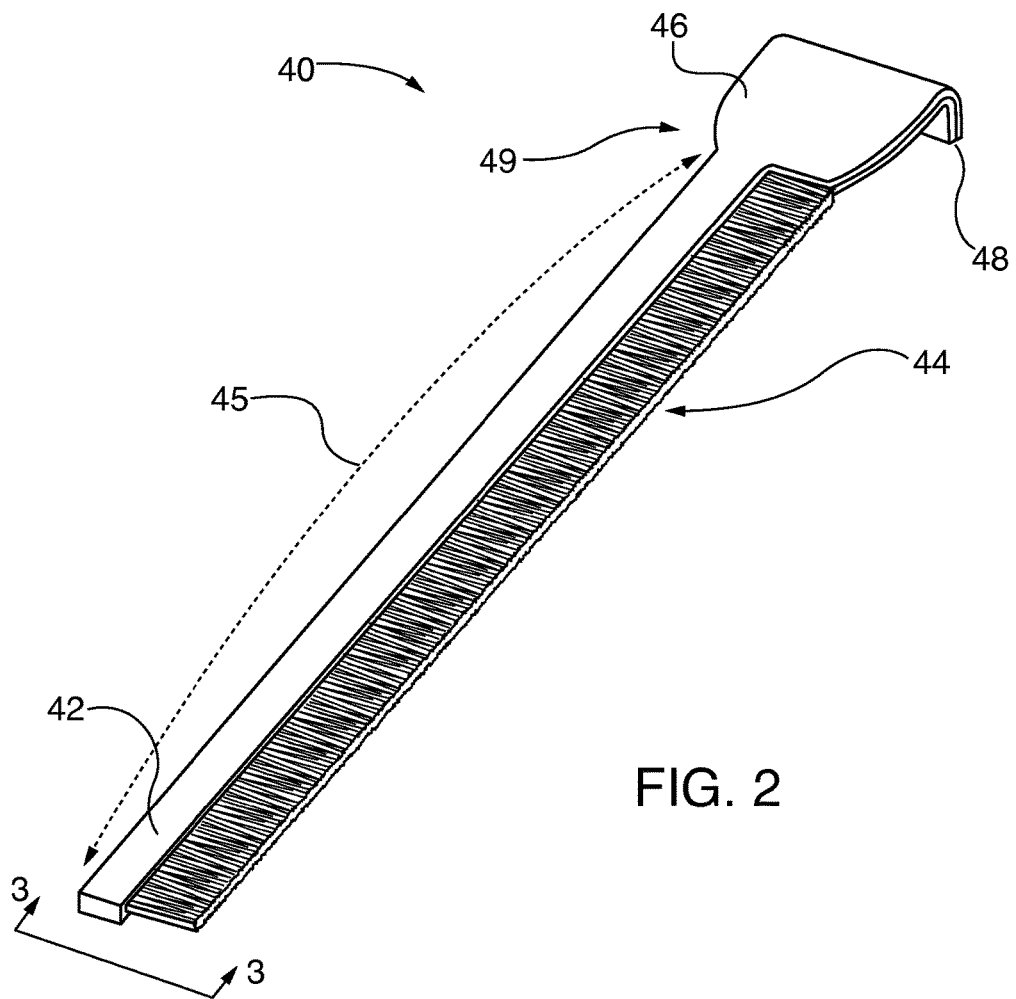
FIG. 2 is a perspective view of a side seal 40 for use with a transition piece of the gas turbine.
Figure 3:
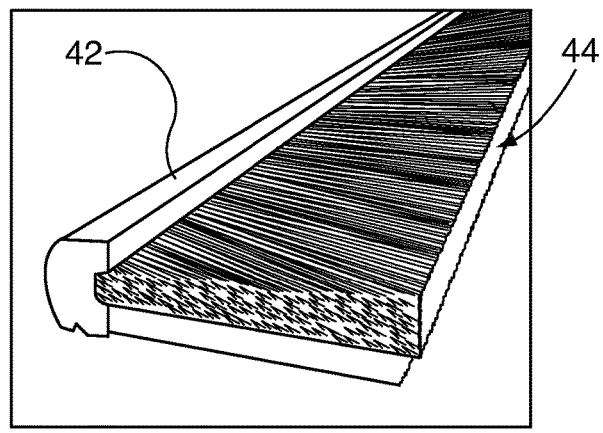
FIG. 3 is an enlarged view of an end of the side seal along view line 3-3 of FIG. 3.

Referring to FIG. 2, a side seal 40 for use with a transition piece 28 of a gas turbine 10 is shown. The side seal 40 includes a longitudinal rail 42 for holding a plurality of flexible brush filaments or bristles 44 to form a brush seal. The bristles 44 are arranged in a pack having a bristle density that forms a sufficient seal for minimizing air leakage between exit frames of a turbine 10 while also allowing a suitable amount of air flow for cooling portions of a transition piece as will be described. Referring to FIG. 3, an enlarged view of an end of the side seal 40 along view line 3-3 of FIG. 3 is shown. The bristles 44 are positioned transverse to the orientation of the rail 42 and may be either perpendicular to the rail 42 or angled relative to the rail 42. The bristles 44 may be fabricated from a cobalt alloy material such as HAYNES® 25 alloy sold by Haynes International, Inc. or other suitable material. Referring back to FIG. 2, the rail 42 includes a planar portion 46 that extends from an upper end 49 of the rail 42. The planar portion 46 is wider than the rail 42 and includes a flange 48 that is oriented transverse to the planar portion 46. The rail 42 is configured to be bendable in a plurality of directions so as to accommodate bowing of an exit frame. In an embodiment, the rail 42 is relatively thin and fabricated from a flexible material to provide sufficient bending. By way of example, the rail 42 is bendable in a direction transverse to the bristles 44. Further, the rail 42 is bendable in the plane of the bristles 44. Referring to FIG. 2, dashed line 45 illustrates upward bending of the rail 42 in order to accommodate corresponding bending in the exit frame. Alternatively, the rail 42 may bend downward in order to accommodate exit frame bending. The use of flexible bristles 44 reduces the likelihood of damage to a mating part and enhances the longevity and reliability of a sealing arrangement between exit frames and the side seals in order to maintain engine efficiency and performance while also reducing repair costs.

Figure 4:
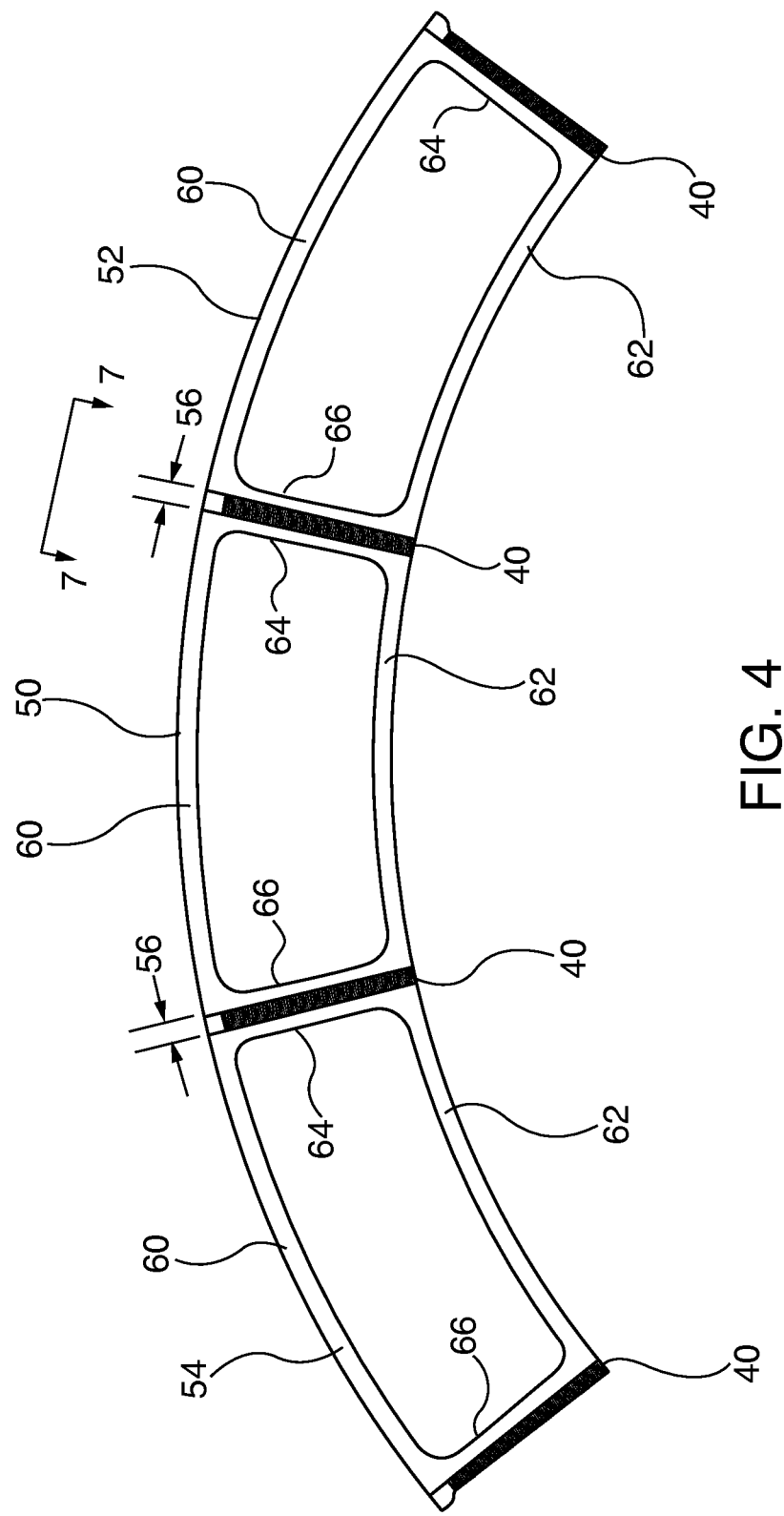
FIG. 4 is a view of a section of a circular array of exit frames that illustrates exemplary first, second and third exit frames.
Figure 5:
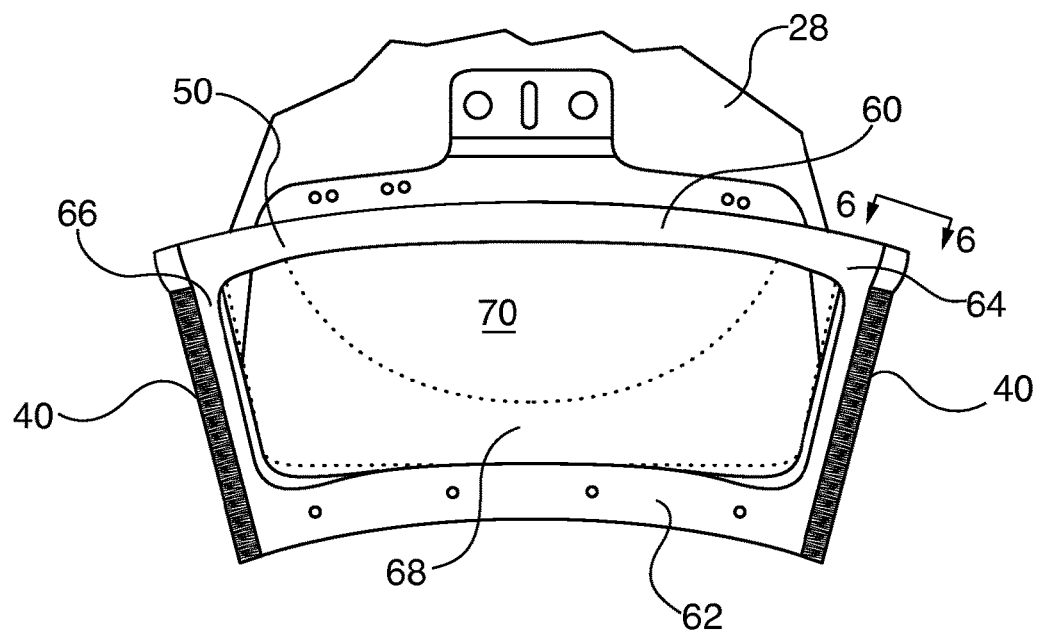
FIG. 5 depicts an end or downstream view of an exemplary exit frame.

Each combustor assembly 26 of a gas turbine 10 is connected to an inlet of a turbine section 16 by a transition piece 28. The downstream end of each transition piece 28 includes an exit frame that is attached to a corresponding inlet of the turbine section 16 thus forming a circular array of adjacent exit frames about the axis. Referring to FIG. 4, a view of a section of a circular array of exit frames that illustrates exemplary first 50, second 52 and third 54 exit frames is shown. The first 50 and second 52 exit frames and the first 50 and third 54 exit frames are separated by a frame gap 56. As will be described, a side seal 40 in accordance with the invention is inserted into the frame gap 56 between the first 50 and second 52 exit frames and between the first 50 and third 54 exit frames to form a seal that minimizes air leakage between the exit frames (for example air leakage from a surrounding casing where a compressor supplies pressurized air). It is noted that the current invention is also applicable to exit frames that are arranged in a noncircular geometry. FIG. 5 depicts an end or downstream view of an exemplary exit frame, such as the first exit frame 50 of FIG. 4. Each exit frame 50, 52, 54 is attached to a corresponding transition piece 28. Each exit frame 50, 52, 54 includes radially outer 60 and inner 62 frame sections that are sealed against corresponding outer and inner retainer elements of a turbine inlet to minimize leakage between the transition duct 28 and the turbine inlet. Each exit frame 50, 52, 54 also includes spaced apart first 64 and second 66 side frame sections that are oriented substantially transverse to the outer 60 and inner 62 sections. The outer 60 and inner 62 frame sections and the first 64 and second 66 side sections form a transition exit 68 that is in fluid communication with a transition piece pathway 70 that extends through the transition piece 28. In use, combustion gas from a combustion assembly 26 flows through the transition piece pathway 70 and the transition exit 68 and into a turbine inlet.

Figure 6:
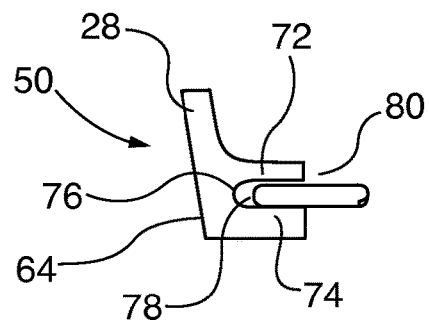
FIG. 6 is a top view of a first side section of a first exit frame along view line 6-6 of FIG. 5.
Figure 7:
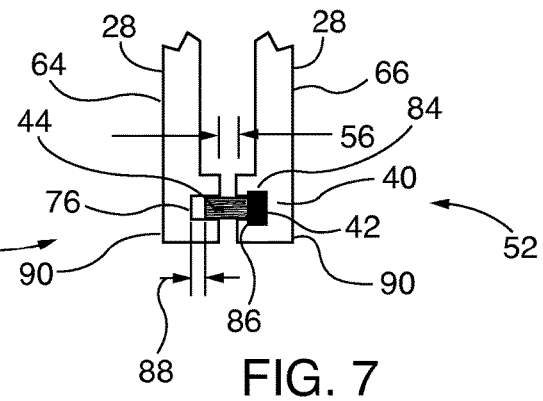
FIG. 7 is a view of portions of the first and second exit frames along view line 7-7 of FIG. 4.
Figure 8:
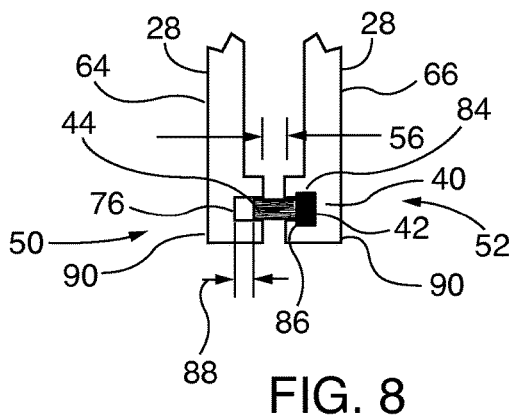
FIG. 8 depicts bristles of a side seal that are of sufficient size to accommodate movement of a transition piece, or both transition pieces, which results in an increase in the size of a frame gap.
Figure 9:
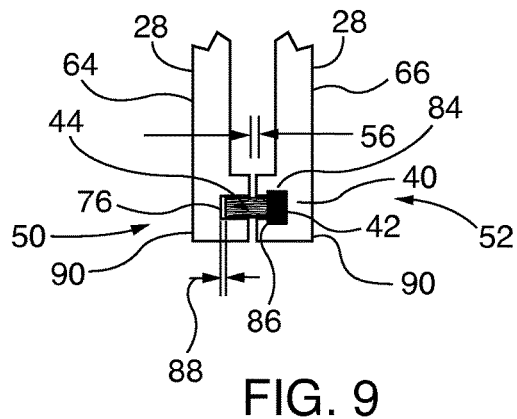
FIG. 9 depicts bristles of a side seal that are suitably sized such that the bristles do not bottom out against a first bottom section of a bristle slot.
Figure 10:
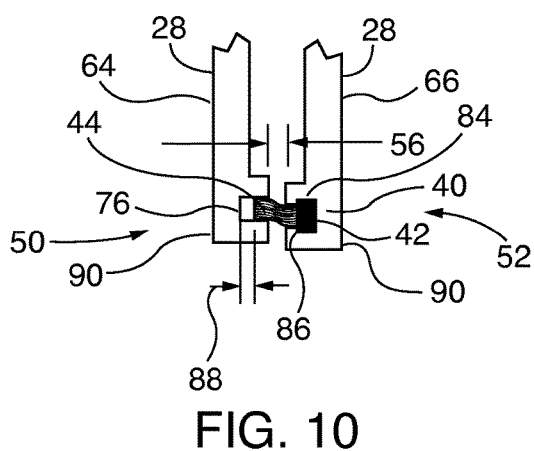
FIGS. 10-11 depicts bristles of a side seal that are sufficiently flexible so as to accommodate axial movement or misalignment of a transition piece, or both transition pieces 28.
Figure 11:
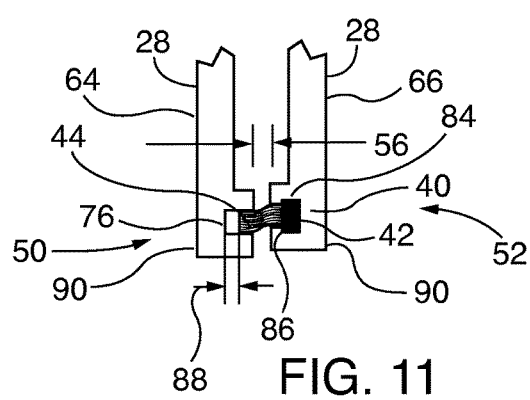

The first 64 and second 66 side sections of each exit frame 50, 52, 54 receive the bristles 44 and rail 42, respectively, of a side seal 40. Referring to FIG. 6, a top view of the first side section 64 of the first exit frame 50 along view line 6-6 of FIG. 5 is shown. The first side section 64 includes first 72 and second 74 spaced apart walls and a first bottom section 76 that form a substantially U-shaped bristle slot 78 that extends the length of the first side section 64 between the outer 60 and inner 62 frame sections. The bristle slot 78 includes a bristle slot opening 80 for receiving bristles 44 of a side seal 40 located in adjacent second exit frame 52. In another embodiment, the first 72 and second 74 spaced apart walls may be sloped toward each other and intersect at the bottom section 76 to form a substantially V-shaped bristle slot 78. It is understood that other shapes or configurations for the bristle slot 78 may be used. For example, the walls 72, 74 may have a curved or partially curved shape.

Referring to FIGS. 7-11, views of portions first 50 and second 52 exit frames along view line 7-7 of FIG. 4 are shown. The second side section 66 of the second exit frame 52 is located adjacent to the first side section 64 of the first exit frame 50. The second side section 66 includes a rail slot 84 shaped for receiving a rail 42 of a side seal 40. The bristles 44 extend through a rail slot opening 86 formed in the rail slot 84. In one embodiment, the rail slot 84 has a substantially rectangular shape for receiving a rail 42 having a corresponding shape. The rail slot 84 extends the length of the second side section 66 between the outer 60 and inner 62 frame sections. In an embodiment, the rail 42 is configured to fit into exit frames of gas turbines currently in use to enable retrofitting of the side seal 40.

In accordance with embodiments of the invention, the bristles 44 of the side seal 40 are sized such that a bristle gap 88 is formed between the bristles 44 and the first bottom section 76. The size of the bristle gap 88 is selected to accommodate anticipated movement of an associated transition piece 28, or both transition pieces 28, during operation of a gas turbine while still maintaining a sufficient seal between adjacent exit frames to minimize air leakage between the exit frames. Further, the size of the bristle gap 88 is dependent on a gas turbine frame type (for example, an H or F type frame). The movement of the transition pieces 28 may be due to relative thermal growth, heat distortion and other factors which occur during operation of the gas turbine. In particular, the bristles 44 are of sufficient size to accommodate movement of a transition piece 28, or both transition pieces 28, which results in an increase in the size of the frame gap 56 (see FIG. 8). Further, the bristles 44 are sized to prevent disengagement of the bristles 44 with the bristle slot 78 during a worst possible distortion scenario. In addition, the bristles 44 are suitably sized such that the bristles 44 do not bottom out against the first bottom section 76 resulting in damage to the bristles 44 (for example, the bristles 44 are crushed and no longer flexible) when movement of a transition piece 28, or both transition pieces 28, results in a decrease in the size of the frame gap 56 (see FIG. 9). Further, the bristles 44 are sufficiently flexible so as to accommodate axial movement or misalignment of a transition piece 28, or both transition pieces 28 (see FIGS. 10-11). Moreover, the bristles 44 are also configured to allow a suitable amount of air flow through the bristles 44 so as to enable cooling of portions 90 of the exit frame 50 and associated transition piece 28.

Assembly of a seal 40 between exemplary first 50 and second 52 exit frames of FIG. 4 will now be described. In particular, a rail 42 of a side seal 40 is inserted into the rail slot 84 of the second side section 66 of the second exit frame 52. In addition, the bristles 44 of the side seal 40 are inserted into the bristle slot 78 of adjacent first side section 64 of first exit frame 50. The side seal 40 is then slid downward until the flange 48 abuts against the outer frame section 60 of the first 50 and second 52 exit frames, thus inhibiting further downward movement of the side seal 40. In this position, the bristles 44 from the side seal 40 extend across the frame gap 56 and into the bristle slot 78 thus forming a seal.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A sealing arrangement for sealing between adjacent exit frames of a turbine, wherein the exit frames are separated by a frame gap and each exit frame is associated with a transition piece, comprising:
   a transition side seal having bristles and a rail;
   a first exit frame having a rail slot for receiving the rail; and
   a second exit frame having a bristle slot for receiving the bristles to form a seal between the first and second exit frames
   wherein the seal minimizes air leakage between the first and second exit frames while allowing an amount of air flow through the bristles in order to cool portions of the first and second exit frames and transition piece,
   wherein the bristle slot includes a bottom section and the bristles are separated from the bottom section by a bristle gap,
   wherein the bristles extend from the rail into the rail slot and into the bristle slot,
   wherein the bristles are positioned transverse to an orientation of the rail, and
   wherein an end of the rail includes a planar portion having a flange that abuts against an outer frame section of the first and second exit frames to stop movement of the side seal.

2. The sealing arrangement according to claim 1, wherein the bristle gap is sized to accommodate movement of at least one transition piece to maintain a seal between the first and second exit frames or avoid damage to the bristles.

3. The sealing arrangement according to claim 2, wherein movement of the at least one transition piece causes the frame gap to either increase or decrease in size.

4. The sealing arrangement according to claim 2, wherein movement of the at least one transition piece causes a misalignment of the transition pieces.

5. The sealing arrangement according to claim 1, wherein the bristles are positioned transverse to an orientation of the rail.

6. The sealing arrangement according to claim 5, wherein the bristles are either perpendicular to the rail or angled relative to the rail.

7. The sealing arrangement according to claim 1, wherein the rail and bristles are fabricated from a flexible material.

8. The sealing arrangement according to claim 7, wherein the rail is bendable in a plurality of directions to accommodate bowing of an associated exit frame.

9. The sealing arrangement according to claim 7, wherein the bristles are fabricated from a cobalt alloy material.

10. A sealing arrangement for sealing between adjacent exit frames of a turbine, wherein the exit frames are separated by a frame gap and each exit frame is associated with a transition piece and wherein each exit frame includes an outer frame section, comprising:
    a transition side seal having bristles and a rail;
    a first exit frame having a rail slot for receiving the rail wherein the rail is bendable in a plurality of directions to accommodate bowing of the first exit frame; and
    a second exit frame having a bristle slot for receiving the bristles to form a seal between the first and second exit frames, wherein the bristle slot includes a bottom section and the bristles are separated from the bottom section by a bristle gap that is sized to accommodate movement of at least one transition piece to maintain a seal between the first and second exit frames or avoid damage to the bristles,
    wherein the seal minimizes air leakage between the first and second exit frames while allowing an amount of air flow through the bristles in order to cool portions of the first and second exit frames and transition piece,
    wherein the bristles extend from the rail into the rail slot and into the bristle slot, and
    wherein the bristles are positioned transverse to an orientation of the rail, and
    wherein an end of the rail includes a planar portion having a flange that abuts against an outer frame section of the first and second exit frames to stop movement of the side seal.

11. The sealing arrangement according to claim 10, wherein movement of the at least one transition piece causes the frame gap to either increase or decrease in size.

12. The sealing arrangement according to claim 10, wherein movement of the at least one transition piece causes a misalignment of the transition pieces.

13. The sealing arrangement according to claim 10, wherein the bristles are either perpendicular to the rail or angled relative to the rail.

14. The sealing arrangement according to claim 10, wherein the rail and bristles are fabricated from a flexible material.

15. The sealing arrangement according to claim 10, wherein the bristles are fabricated from a cobalt alloy material.

16. A method for sealing between adjacent exit frames of a turbine, wherein the exit frames are separated by a frame gap and each exit frame is associated with a transition piece, comprising:

providing a transition side seal having bristles and a rail, wherein the bristles extend from the rail;

providing a first exit frame having a rail slot for receiving the rail;

providing a second exit frame having a bristle slot for receiving the bristles to form a seal between the first and second exit frames, wherein the bristle slot includes a bottom section;

providing a bristle gap for spacing apart the bristles and the bottom section; and inserting the rail into the rail slot such that the transition side seal extends across the frame gap such that the bristles extend from the rail slot across the frame gap into the bristle gap.

17. The method according to claim 16, wherein the bristle gap is sized to accommodate movement of at least one transition piece to maintain a seal between the first and second exit frames or avoid damage to the bristles.

18. The method according to claim 16, wherein the rail is bendable in a direction transverse to the bristles to accommodate bowing of an exit frame.

\* \* \* \* \*